United States Patent Office 3,496,189
Patented Feb. 17, 1970

3,496,189
3-PHENYL-7-BENZOTRIAZOLYL-COUMARIN COMPOUNDS
Wolf-Dieter Wirth, Cologne-Stammheim, Carl-Wolfgang Schellhammer, Opladen, and Hans Knupfer, Bergisch-Neukirchen, Germany, assignors to Farbenfabriken Bayer Aktiengesellschaft, Leverkusen, Germany, a corporation of Germany
No Drawing. Filed July 22, 1966, Ser. No. 567,047
Claims priority, application Germany, Aug. 7, 1965,
F 46,841
Int. Cl. C07d 55/04; C09k 1/02
U.S. Cl. 260—308                 8 Claims

ABSTRACT OF THE DISCLOSURE 3-phenyl-7-benzotriazolyl-coumarin compounds having utility as brightening agents for fibers, filaments, fabrics, knitted fabrics or plastic material of synthetic origin, and especially for polyvinyl chloride-containing materials.

---

The present invention relates to brightening agents; more particularly it concerns brightening agents which contain, as the active ingredient, 3-phenyl-7-benzotriazolyl-coumarin compounds of the formula

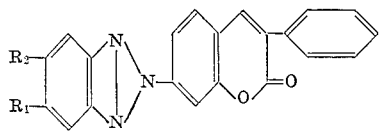

in which $R_1$ stands for an alkoxy group containing 3–12 carbon atoms and $R_2$ denotes an alkyl group.

The alkoxy groups which contain 3–12 carbon atoms and are represented by $R_1$ include those the carbon chain of which is interrupted by an oxygen atom. Suitable alkyl groups as represented by $R_2$ are in the first place lower alkyl groups, such as methyl and ethyl.

The brightening agents of the present invention are suitable for brightening a great variety of materials, chiefly for brightening fibres, filaments, fabrics, knitted fabrics, sheets or plastic materials of synthetic origin and especially for brightening materials of polyvinyl chloride. They can be applied in the usual manner, for example, in the form of aqueous dispersions or of solutions in inert organic solvents; if desired, they can also be used in combination with detergents or with synthetic resins serving for the production of sheets or filaments. The amount of brightening agent required in each case can easily be determined by preliminary experiments; in general, amounts of 0.1–1% of the brightening agent, referred to the weight of the material to be brightened, will suffice.

The 3-phenyl-7-benzotriazolyl-coumarins to be used according to the invention as brightening agents, can be obtained, for example, by condensing 4-acetylamino-salicylidene-aniline with phenylacetic acid in the presence of sodium acetate and acetic anhydride, subsequently heating the reaction mixture with concentrated hydrochloric acid under reflux to boiling temperature, in order to hydrolyse the acetylamino group, then diazotising the resultant 3-phenyl-7-amino-coumarin hydrochloride, coupling the diazonium salt so obtained with a primary aromatic amine of the general formula

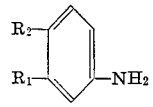

in which $R_1$ and $R_2$ have the same meaning as above, and oxidising the resultant o-aminoazo dyestuff to give the corresponding triazole compound. The amines required for coupling can be obtained by reacting 4-nitro-2-hydroxy-1-alkyl-benzenes with alkyl halides which contain 3–12 carbon atoms and reducing the nitro group in the 4-nitro-2-alkoxy-1-alkyl-benzenes thus formed to give the amino group.

Compared, for instance, with the 3-phenyl-7-benzotriazolyl-coumarin compounds mentioned as brighteners in the British patent specification No. 990,102, the brightening agents according to the present invention have substantial advantages, especially when they are used in polyvinyl chloride. While the 3-phenyl-7-(4'-methyl-5'-methoxy-benzotriazolyl-2')-coumarin mentioned in the above British patent specification separates after a short time on the surface of the polyvinyl chloride to form an unattractive yellow fur, the brightening agents according to the present invention remain in the polyvinyl chloride in the finely divided state for full demonstration of their brightening action.

The following examples serve to illustrate the invention without, however, limiting its scope; the parts given are parts by weight.

EXAMPLE 1

65 parts polyvinyl chloride with a K value of about 72–74, 35 parts dioctyl phthalate, 2 parts of a commercial organic tin compound serving for stabilising the polyvinyl chloride, 1 part rutile titanium dioxide, and 0.1 part 3-phenyl - 7 - (4' - methyl - 5' - n - butoxy - benzotriazolyl-2')-coumarin as brightening agent are rolled on a hot roller with low friction at about 165–170° C. for 5 minutes; the resultant rough sheet is then drawn off on a four-roller calendar to give a film having a strength of about 300μ. The film is excellently brightened and the brightening effect has outstanding fastness to light.

The brightening agent used is prepared in the following manner:

272 parts 4-acetylamino-salicylidene-aniline, 163 parts phenylacetic acid, 98 parts sodium acetate and 532 parts acetic anhydride are heated at boiling temperature under reflux for 18 hours. The reaction mixture is subsequently cooled to 100° C., mixed with 450 parts concentrated hydrochloric acid, again boiled under reflux for 4 hours and then cooled to room temperature. The precipitated 3-phenyl-7-amino-coumarin hydrochloride is filtered off with suction, washed with 80 parts glacial acetic acid and dried. 27.3 parts of the 3-phenyl-7-amino-coumarin hydrochloride so obtained are suspended in 200 parts glacial acetic acid, the suspension is mixed with 30 parts concentrated hydrochloric acid and then cooled; the 3-phenyl-7-amino-coumarin hydrochloride is then diazotised at +10° C., a solution of 38.5 parts 4-amino-2-n-butoxy-1-methyl-benzene in 60 parts glacial acetic acid is added with stirring to the diazonium salt solution, the mixture is adjusted to a pH value of about 4 by the dropwise addition of a concentrated sodium hydroxide solution and stirring is continued for several hours. The resultant azo compound is filtered off, washed with water and suspended in 150 parts pyridine. The suspension is mixed with 40 parts copper acetate, heated at boiling temperature under reflux for 30 minutes and then cooled. The precipitated 3-phenyl-7-(4'-methyl-5'-n-butoxy - benzotriazolyl-2')-coumarin is filtered off, washed with water and recrystallised from dimethyl formamide; it has a melting point of 204–207° C.

EXAMPLE 2

A mixture of 30 parts styrene and 70 parts of polyesters which have been prepared from adipic acid and ethylene glycol, is mixed with 2 parts of a 50% paste of cyclohexanone peroxide in dibutyl phthalate, 1 part rutile titanium dioxide and 0.2 part 3-phenyl-7-(4'-methyl-5'-n-butoxy-benzotriazolyl-2')-coumarin; the mixture is poured into a mould and heated at 90–100° C. for 25 minutes. The resultant moulding is excellently brightened and the fastness to light of the brightening effect is outstanding. Instead of the 3-phenyl-7-(4'-methyl-5'-n-butoxy-benzotriazolyl-2')-coumarin mentioned in the above examples, one of the 3-phenyl - 7 - benzotriazolyl - coumarin compounds listed in the following table can also be used as brightening agents. These compounds can be obtained by using for the method of production described in Example 1, instead of 4-amino-2-n-butoxy-1-methyl-benzene, one of the following compounds as coupling component: 4-amino-2-isopropoxy-1-methyl-benzene, 4-amino-2-sec.butoxy-1-methyl-benzene, glycol monoethyl-mono-(2-methyl-5-amino) - phenyl ether, 4-amino-2-i-amyloxy-1-methyl - benzene, 4-amino-2-n-octoxy-1-methyl-benzene or 4-amino-2-n-dodecoxy-1-methyl-benzene.

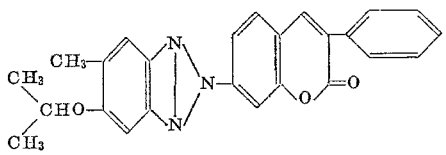

Melting point 218–221° C.

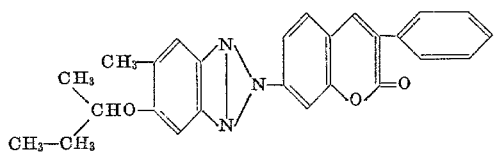

Melting point 188–190° C.

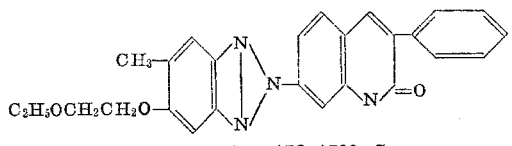

Melting point 178–179° C.

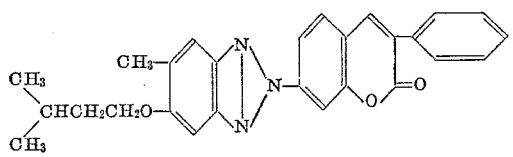

Melting point 236–238° C.

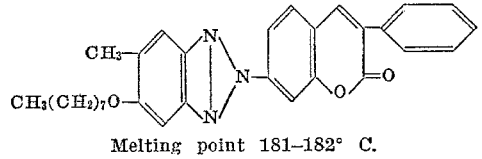

Melting point 181–182° C.

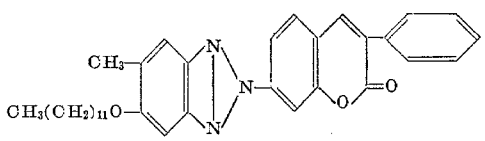

Melting point 171–172° C.

We claim:
1. A compound of the formula

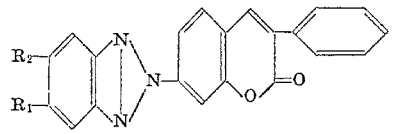

in which

R₁ is an alkoxy group containing 3–12 carbon atoms or alkoxy-alkoxy containing 3–12 carbon atoms, and
R₂ denotes a lower alkyl group.

2. The compound of claim 1 wherein R₁ is butoxy and R₂ is methyl.
3. The compound of claim 1 wherein R₁ is isopropoxy and R₂ is methyl.
4. The compound of claim 1 wherein R₁ is secondary butoxy and R₂ is methyl.
5. The compound of claim 1 wherein R₁ is amyloxy and R₂ is methyl.
6. The compound of claim 1 wherein R₁ is octyloxy and R₂ is methyl.
7. The compound of claim 1 wherein R₁ is dodecycloxy and R₂ is methyl.
8. A compound of the formula

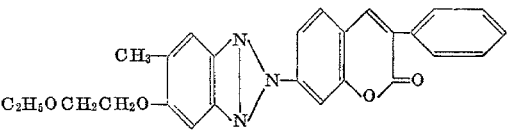

References Cited

UNITED STATES PATENTS 3,288,801    11/1966    Fleck et al. _____ 260—308

ALTON D. ROLLINS, Primary Examiner

U.S. Cl. X.R.

252—152, 301.2; 260—141, 152, 575, 612, 622